United States Patent Office 2,988,583
Patented June 13, 1961

2,988,583
ACCUMULATOR
Anton Bopp, 18 Ormisrain, Meilen, Switzerland
No Drawing. Filed Feb. 12, 1957, Ser. No. 639,664
Claims priority, application Switzerland Feb. 20, 1956
11 Claims. (Cl. 136—6)

The increasingly urgent demands of the recent development of the economy of power for a high grade electrical storage battery are not fulfilled to the extent desired by the storage battery or accumulators hitherto known in spite of all the technical improvements therein.

Hitherto the limitations in the capacity of the electrolyte and the electrodes have been unsatisfactory for many purposes. In practice one has accordingly gone to the lowest permissible limit of technical reliability of operation in the production of electrodes and in the density of the electrolytes, for special problems, which had to be paid for, at the expense of efficiency and durability. The batteries thus obtained are extremely uneconomical as storage batteries or accumulators, and are even unsuitable. The capacity improved in this way is dearly paid for, as for example in the present types of starter batteries and such batteries are still insufficient, apart from their uneconomical operation, for competition in new fields of application such as transportation.

The low overall energy efficiency of only about 60 to 80% of the present batteries is insufficient even in normal use. While the output of current is mostly good, this is essentially due to poor output of voltage owing to hydrogen sensitivity. The additional voltage drop with increasing load as occurs particularly in lead storage batteries as a result of self-discharge and is still outside these considerations.

For wider applications these negative findings mean furthermore that the permissible intensities of charging and discharging are actually much too low.

Moreover the present low temperature limitations of use of such batteries must be considered as quite unsatisfactory.

In contradistinction the new accumulator according to the present invention comprises an improvement over the prior art accumulators or storage batteries.

As will be apparent from the disclosure, the present invention opens up new possibilities for storage as well as for primary batteries and extends the utility thereof beyond the present limitations of such batteries.

Comparative limitations made with new lead storage battery cells based on equal external volumes of 1850 cc. illustrate the superiority of the battery of the present invention referred to below as the "P.3.b."

The co-efficient of efficiency amounts to more than 98% as compared with 60 to 80% and less of the usual lead accumulators.

The capacity is increased:

(1) 19.0 fold for P.3.b.–E 1.5 types at a constant discharge current of 32 amps.

(2) 26.0 fold for P.3.b.–E 1.5 types at a constant discharge current of 70 amps.

The usable energy outputs at the above current densities for a P.3.b.–E 1.5 accumulator are 20.8 and 32.6 times, respectively, greater than the control lead batteries.

The short circuit outputs of the P.3.b.–E 1.5 are approximately 36 times greater than those of control lead cells of equal size.

(With a current of 4440 amps. twice during 20 seconds a P.3.b.–E 1.5 cell of 1850 cubic centimetres external volume yielded at any time a power of 3.02 H.P. Lead accumulator cells of equal size yielded in comparison when brought into operation a peak value of only 0.17 H.P. which quickly dropped to below 0.085 H.P. and could not be kept constant. Upon repetition of the test the control lead cells failed to reproduce their initial outputs, while the P.3.b. cell even improved on its initial output.)

The "eagerness" of the P.3.b. cell is shown very conspicuously in the voltage graphs at constant current intensity obtained at high current densities not attainable with other storage batteries, the graphs extending practically rectilinearly and horizontally and dropping off only at the point where the cells are exhausted. The graphs of control cells drop off steeply at once.

The cold resistance of the P.3.b. cell is completely unattained, insofar as it functions normally with full current up to minus 70° C. Even down to minus 72° C. only a tiny voltage drop of 0.06 volt occurs.

To these advantages are to be added a superior durability and strongly reduced liability to self-discharge, owing to the abolition of hydrogen sensitivity and of detrimental excess voltages, and the important fact, that P.3.b. accumulators, with the exception of the electrolyte, can be readily produced with the aid of normal commercial materials without much ado.

The various extraordinary superiorities of the P.3.b. accumulator result from the co-operation of the qualities of its novel electrolyte with its lead-lead dioxide electrode system.

With respect to the new electrolyte, this invention puts to use knowledge which the inventor has obtained in the galvanic use of fuels in the fuel cells. The transfer of principles for the increase of reactivity in the oxidation and reduction range there to the conditions of the ideal accumulator and accordingly the introduction of special "mediating substances" has been successful. As regards oxidation in electro chemistry, several substances stimulating reactions have been known which were useful for increasing the potential as regards reduction, the counterpart has been missing so far. In the present case in the P.3.b. accumulator, an organic substance and a derivative of fluorine co-operate and control its behaviour.

These substances are inexpensive and extremely stable so that in five years' full operation including 1500 chargings and dischargings no wear or drop in efficiency took place and for example the electrodes, e.g. of starter battery type, of a cell of 1500 cubic centimeters external volume remained as good as new after having been daily charged at 5 amps. and discharged at 30 amps. Even numerous short circuits were suffered without damage and thus its durability and long life have been demonstrated.

The electrolyte has the following compositions and limitations:

Table I

| | Parts by weight |
|---|---|
| Water | 400–600 |
| Sulphuric acid of 96% | 300–600 |
| Sodium fluoride less than | 20 |
| Tri-ethanol amine phosphate less than 2% of weight of total electrolyte. | |

As an operative electrolyte, e.g. of a P.3.b.–E 1.5 cell type, the composition of the electrolyte is as follows:

Table II

| | Parts by weight |
|---|---|
| Water | 500 |
| Sulphuric acid of 96% | 600 |
| Sodium fluoride | 5 |
| Tri-ethanol amine phosphate | 3–7 |

This embodiment has a density of 1.4356 at 15° C. and is discharged down to 1.050 at 15° C. by the predetermined capacitive limitation, for example of E–1.5 millimeter electrodes. Further modifications within the above limits are permissible, for example with E–3 millimeter electrodes for the prevention of excess capacity in the electrolyte, a proportion of 40% acid of equal volume has been used under otherwise equal conditions, with 5 parts by weight of sodium fluoride and up to 7.5 cubic centimeters of tri-ethanol amine phosphate.

The fluoride can be replaced by its anionic equivalent in another soluble form, except, as it were, metal compounds the metals of which are nobler than lead. Partial reaction with silica or glass is permissible.

The reaction controlling effect of fluorine, particularly in the presence of $SO_4$-ions, is improved by the presence of tri-ethanol amine or its salt, the phosphate, which may be wholly or partly replaced by the sulphate so that (1) a reversible carrying of potential of the P.3.b. accumulator with more than 97% efficiency is attained, (2) so that charging and discharge voltage graphs can be made to approach one another over the whole of these ranges to an average of less than 0.05 to 0.005 volts, (3) the voltage increment in the range of hyrdogen and oxygen development, otherwise notorious therefor and amounting up to 0.8 volt in the conventional lead accumulator, is abolished, and (4) in general any gas formation is done away with up to the time that the electrolyte regains its starting density, when charging the P.3.b. accumulator.

The aforesaid saving behaviour of the P.3.b. electrolyte with respect to its electrodes which are hardly stressed by gas pressure at all, expresses itself not only in a prolonged durability and life time of the cells but also particularly in that without any mechanical risk, electrodes having active masses equal exploited not only to 6% or to a maximum of 30% of their weight but to at least 70% and 80% thereof can be employed. This is attained by known measures relating to porosity and cross section dimensions. In the manufacture of the P.3.b. cells the densest packing of the structural components has always been used, so that almost quasi dry cells are made available.

A P.3.b.-20/E-1.5 single cell accordingly has the following external features as compared with other embodiments:

Table III

External volume, 122 x 158 x 195 mm.=3058 ccs.
Electrodes net volume=about 810 ccs.
Electrolyte of density 1.4356 at 15° C.=about 1950 ccs.
E.M.F.=about 2.42 volts.
Usable capacity=about 360 amp. hours.
Energy content at 2.35 volts mean E.M.F.=about 846 watt hours.

The battery shows a substantially constant voltage during discharge and recharging at a current density of about 1.45 amps. during a period of over 100 hours.

The P.3.b. cell (operated at current intensities between 1.45 and 70 amps.) hardly varies in capacity up to 32 amps. current intensity and has a voltage which remains generally high and almost equal over this whole range of current intensity. With a well-known commercial type battery, the capacity is less and diminishes at once with increasing current intensity and the voltages correspondingly decrease.

As regards the capacity at different discharge intensities for example the control lead cell mentioned hereinabove of an external volume of 1850 ccs. had the following scatter:

Table IV

| | Amp. hours |
|---|---|
| At 2.8 amps. current | 28 |
| At 32 amps. current | 9.87 |
| At 70 amps. current | 6.0 |

In contradistinction a P.3.b.-10E-1.5 type of equal external size of 1850 ccs. with a predetermined limitation of the acid and of the electrodes to approximately 185 amp. hours and about 225 amp. hours, respectively, showed the following scatter:

Table V

At 1.45 amps. current—185 amp. hours and 225 amp. hours, respectively.
At 7.25 amps. current—185 amp. hours and 225 amp. hours, respectively.
At 32 amps. current—180 amp. hours and 220 amp. hours, respectively.
At 70 amps. current—153 amp. hours and 187 amp. hours, respectively.

Accordingly the P.3.b. cell remains at the theoretical maximum of its capacity up to the highest current densities and, at such a low voltage drop that the aforesaid high energy outputs result.

Even against uneconomic storage batteries of the kind of the most modern starter types, which have additional disadvantages, the P.3.b. cell is volumetrically several times superior, and at high current densities many times superior, while preserving all of its advantages.

It has already been shown hereinabove that the new cell keeps structurally to well tried rules. Only the most favourable electrode make-ups of the kinds known in themselves are used and the above mentioned usage of capacity is observed. Likewise the densest packing is used so that the highest mechanical stability results, and by the aid of separators (i.e. faths, grids, porous plates etc.) and, if desired, of negative box plates the dropping out of the active mass is prevented.

The electrodes are lead and lead dioxide electrodes as in the conventional lead accumulator.

Tests have shown that the self-discharging characteristics of the storage batteries of the invention, owing to the abolition of the hydrogen sensitivity, has been considerably reduced and amounts, on an average, to about $\frac{1}{3}$ to $\frac{1}{5}$ of the best values attained hitherto.

Also the availability of the energy of the P.3.b. cell has been found to be many times higher. This permissibility of carrying a superior current density is due not only to its electrolyte but also to its adapted construction with its greater division of area and reduced diffusion paths.

Whereas the ordinary lead accumulator is adapted to be charged at 1.95 amps. and a modern type of starter battery permits charging at 15 to 20 amps., a P.3.b. cell of equal size can be charged at about 80 amps.

As regards the enormous cold resistance of the P.3.b. cell, it should be noted that the same is independent of the freezing point of the acid and of the conductivity characteristic. Even below —72° C. with an electrolyte which is already viscous, the new cell operates normally, while sulphuric acid of equal density would have frozen already between —23 and —27° C.

Finally, as regards the insensitivity to hydrogen and oxygen of the P.3.b. cell, it should be remarked that tests with organic substances of limited solubility for the reduction of secondary reactions in primary elements cannot be compared therewith, since they are irreversible and in contrast to the present very soluble addition, would be destroyed by alternating reversal of current.

While I have herein described and illustrated what may be considered a typical and particularly useful embodiment of my said invention I wish it to be understood that I do not limit to the particular details and numerical data disclosed for obvious modifications will occur to a person skilled in the art.

What I claim as my invention and desire to secure by Letters Patent, is:

1. An electric accumulator comprising in combination: Pb electrodes, $PbO_2$ electrodes and an electrolyte consisting essentially of

| | Parts by weight |
|---|---|
| Water | 500 |
| Sulphuric acid of 96% | 600 |
| Sodium fluoride | 5 |
| Tri-ethanol amine phosphate | 3–7 |

2. An electric storage battery comprising in combination at least one lead electrode, at least one lead dioxide electrode, and an electrolyte consisting essentially of the following components:

Water—400–600 parts by weight,
Sulfuric acid (based on 96% $H_2SO_4$)—300–600 parts by weight,
A water soluble fluoride selected from the group consisting of hydrogen fluoride, fluoride salts of lead and fluoride salts of metals less noble than lead—from about 2.4 to about 20 parts by weight,
An acid resistant hydrotropic compound selected from the group consisting of amines and salts thereof from about 0.25% to about 2% of the total weight of the electrolyte.

3. An electric storage battery comprising in combination at least one lead electrode, at least one lead dioxide electrode, and an electrolyte consisting essentially of the following components:

Water—400–600 parts by weight,
Sulfuric acid (based on 96% $H_2SO_4$)—300–600 parts by weight,
A water soluble fluoride selected from the group consisting of hydrogen fluoride, fluoride salts of lead and fluoride salts of metals less noble than lead—from about 2.4 to about 20 parts by weight,
A hydrotropic compound selected from the group consisting of triethanol amine and salts thereof—from about 0.25% to about 2% of the total weight of the electrolyte.

4. An electric storage battery comprising in combination at least one lead electrode, at least one lead dioxide electrode, and an electrolyte consisting essentially of the following components:

Water—400–600 parts by weight,
Sulfuric acid (based on 96% $H_2SO_4$)—300–600 parts by weight,
A water soluble fluoride selected from the group consisting of hydrogen fluoride, fluoride salts of lead and fluoride salts of metals less noble than lead—from about 5 to about 20 parts by weight,
A compound selected from the group consisting of triethanol amine and salts thereof—from about 0.25% to about 2% of the total weight of electrolyte.

5. A storage battery as claimed in claim 3 wherein said fluoride is hydrofluoric acid.

6. A storage battery as claimed in claim 3 wherein said fluoride is an alkali metal fluoride.

7. A storage battery as claimed in claim 3 wherein said fluoride is the reaction product of a water soluble fluoride compound with a compound selected from the group consisting of silica and glass.

8. A storage battery as claimed in claim 3 wherein said amine comprises triethanolamine phosphate.

9. In an electric storage battery of the $Pb-PbO_2$ type, an electrolyte consisting essentially of the following ingredients in the proportions set forth:

Water—400–600 parts by weight,
Sulfuric acid (based on 96% $H_2SO_4$)—300–600 parts by weight,
A water soluble fluoride selected from the group consisting of hydrogen fluoride, fluoride salts of lead and fluoride salts of metals less noble than lead—from about 2.4 to about 20 parts by weight,
An acid resistant hydrotropic compound selected from the group consisting of amines and salts thereof—from about 0.25% to about 2% of the total weight of the electrolyte.

10. In an electric storage battery of the $Pb-PbO_2$ type, an electrolyte consisting essentially of the following ingredients in the proportions set forth:

Water—400–600 parts by weight,
Sulfuric acid (based on 96% $H_2SO_4$)—300–600 parts by weight,
A water soluble fluoride selected from the group consisting of hydrogen fluoride, fluoride salts of lead and of metal less noble than lead—from about 2.4 to about 20 parts by weight,
A compound selected from the group consisting of triethanol amine and salts thereof—from about 0.25% to about 2% of the total weight of the electrolyte.

11. In an electric storage battery of the $Pb-PbO_2$ type, an electrolyte consisting essentially of the following ingredients in the proportions set forth:

Water—400–600 parts by weight,
Sulfuric acid (based on 96% $H_2SO_4$)—300–600 parts by weight,
Alakli metal fluoride—about 5 to about 20 parts by weight,
Triethanol amine salt of inorganic acid—from about 0.25% to about 2% of the total weight of the electrolyte.

References Cited in the file of this patent

UNITED STATES PATENTS

| | | |
|---|---|---|
| 379,180 | Partz | Mar. 6, 1888 |
| 759,065 | Betts | May 3, 1904 |
| 2,715,082 | Gritman et al. | Aug. 9, 1955 |
| 2,715,149 | Joynt | Aug. 9, 1955 |

FOREIGN PATENTS

| | | |
|---|---|---|
| 412,133 | Great Britain | July 12, 1934 |
| 449,687 | Great Britain | July 1, 1936 |